W. H. BELL.
AUTOMOBILE CHASSIS.
APPLICATION FILED NOV. 2, 1910.
1,014,562.
Patented Jan. 9, 1912.
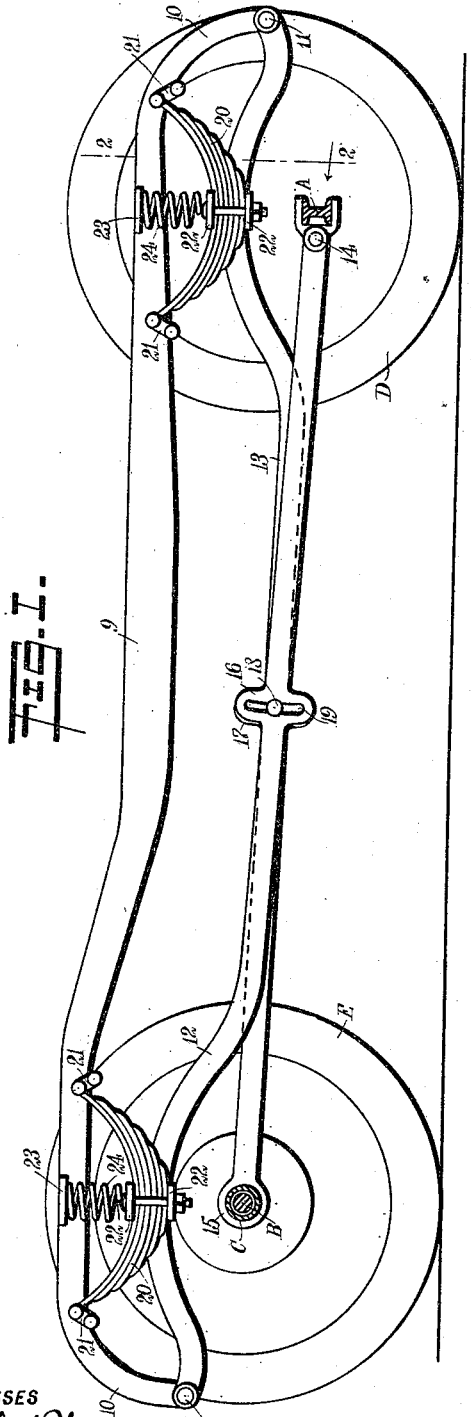
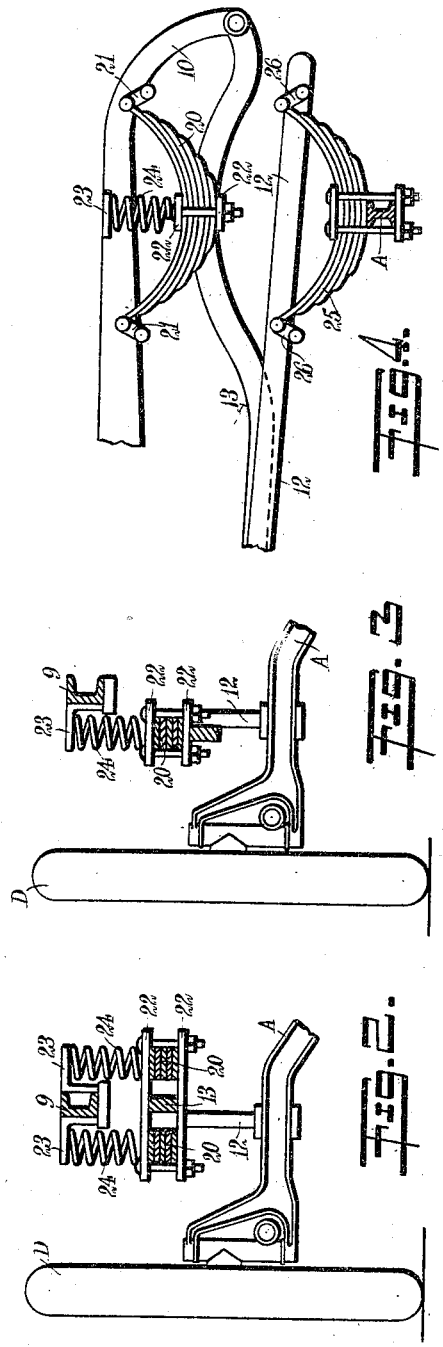
INVENTOR
William H. Bell
BY
ATTORNEYS
WITNESSES
G. Robert Thomas

UNITED STATES PATENT OFFICE.

WILLIAM H. BELL, OF NEW YORK, N. Y., ASSIGNOR TO OSWALD J. KARSCH, OF NEW YORK, N. Y.

AUTOMOBILE-CHASSIS.

1,014,562.   Specification of Letters Patent.   Patented Jan. 9, 1912.

Application filed November 2, 1910. Serial No. 590,333.

*To all whom it may concern:*

Be it known that I, WILLIAM H. BELL, a citizen of the United States, and a resident of the city of New York, borough of Manhattan, in the county and State of New York, have invented a new and Improved Automobile-Chassis, of which the following is a full, clear, and exact description.

Among the principal objects which the present invention has in view are: to provide a supporting frame for an automobile frame connecting the wheel and axles, said body constructed and arranged to provide resilient supports, the vibrations whereof are slowed; and to provide resilient members to normally separate the structural members thereof.

One embodiment of the present invention is disclosed in the structure illustrated in the accompanying drawings, in which like characters of reference denote corresponding parts in all the views, and in which—

Figure 1 is a vertical longitudinal section of an automobile chassis, showing in side elevation side bars constructed and arranged in accordance with the present invention, and on one side of the said chassis; Fig. 2 is a vertical section taken on the line 2—2 in Fig. 1; Fig. 3 is a modified form of the invention, shown as a vertical cross section taken through one of the said bars; and Fig. 4 is a modified form of the invention, showing in side elevation side bars constructed and arranged in accordance with the present invention employing a plurality of riding springs.

The side bar 9 shown in the drawings is of any approved construction. It is provided with bowed ends 10, 10, to the lower ends whereof, by means of thill pins 11, 11, are connected swing bars 12 and 13. The swing bars 12 and 13 are each pivotally connected with the axle of the automobile farthest removed from the end of the side bar 9 to which the said swing bar is connected. For instance, the swing bar 12 is connected with the steering axle A of the automobile by means of a thill pin 14, while the swing bar 13 is connected with the driving axle B, being provided with an eyelet end 15 through the eye of which the sleeve C is passed. The swing bars 12 and 13 are each provided with similarly formed sliding plates 16 and 17. The plates 16 and 17 are constructed to bear upon each other in guided relation, and are joined by a connecting pin 18, which is extended through slots 19. The slots 19 are each formed to an arc concentric with the pivot connection with the wheel axle of each swing bar upon which one of said plates is formed. That is to say, the slot 19 formed in the riding plate 16 on the swing bar 12 is formed concentric with the center of the thill pin 14, while the slot 19 constructed in the plate 17 is formed concentric with the center of the axle B, or the center of the eye in the end 15 of the swing bar 13. In all positions the pin 18 maintains the separation of the axles A and B and the parallelity thereof, said pin being supported by both said plates 16 and 17 and in the slots 19 therein.

It will be noted that by the construction where the bowed ends 10, 10 are dropped to near the level of the axles A, B, and that where the swing bars 11 and 13 are provided with a straight extension substantially alined with the said axles, the arcs of movement of the pins 11, 11 and the axles A and B are approximately vertical and parallel. By means of this construction and by reason of the connection between the swing arms 12 and 13 by the pin 18, the wheel bearing ends of the axles are maintained equally distant in all positions of vibration of the wheels E, E.

Disposed between each of the swing bars 12 and 13 and side bar 9 are elliptical riding springs 20, 20. The springs 20, 20 are shown in the drawings as laminated leaf springs of usual construction. The springs 20 are pivotally connected by means of pivot links 21, 21 to the side bars 9, 9, and by means of clamp plates 22. 22 to the swing bars 12 and 13, respectively.

In the form of the invention shown in Figs. 1 and 2 of the drawings the springs 20, 20 are disposed on opposite sides of the swing bars 12 and 13. In this form the side bar 9 is provided with lateral brackets 23, 23 between which and the upper clamp plate 22 are coiled bolster springs 24, 24. The bolster springs 24, 24 are constructed in any approved form, and as usual in the operation of such springs, exert rapidly increasing resistances as the springs are compressed laterally.

In the form of the invention shown in

Fig. 3, the springs 20 and 24 are disposed on one side only of the side bar 9, and as shown, preferably at the outside of the said bar.

In the form of the invention shown in Fig. 4 of the drawings, the leaf springs 25 are connected by means of links 26, 26 to the swing bars and to the axle A. By mounting the swing bars 12 and 13 in this manner a greater resiliency is provided in the hanging for the automobile body.

The operation of the invention is as follows: When in the operation of the automobile the steering wheel D overrides an obstruction, the said wheel, and the axle A thereof, are lifted freely. The leverage of the side bar 12 being fulcrumed on the thill pin 11 at the opposite end of the car, compresses easily the elliptical springs 20 located over the driving axle B. The oscillation of the wheel D and the axle A from the controlling pivot pin of the bar 12, which is the thill pin 11 at the rear of the automobile, being elongated, the vibratory effect or transmission to the automobile body is very slight. Hence, in an automobile running gear having hangers constructed as above set forth the wheels would override an obstruction with little or no appreciable jar on the chassis or body of the automobile. It is also true that when in the operation of the automobile the steering wheels D pass over a depression in the road, the wheels being at the long end of a lever formed by the side bars 9, 9, would be forced quickly into the said depression by the springs 20, a slight movement only of the springs being required to produce a long oscillation of the wheel D and axle. It will also be observed that by the dropping of the wheels D into the said depression, the front of the body of the automobile is not depressed, this being supported by the swing bar 13 which is connected to the driving axle B. If the depression be sufficiently long for the body to settle, the rear of the body, which is supported by the bars 12 and the wheel D, settles first. When the driving wheels of the automobile pass into the depression the front of the body is lowered.

The above described action whereby the rear of the body of the automobile is lowered in advance of the front of the body, provides a settling action in the body in counterdistinction to the ordinary dive imparted to the body of vehicles by the ordinary hanger constructions.

Having thus described my invention, what I claim as new and desire to secure by Letters Patent is:—

1. An automobile chassis, comprising a plurality of rigid side bars; a plurality of carrying wheel axles; a plurality of swing bars pivotally connected with said axles and the ends of said side bars, each of said swing bars connecting one of said axles and that end of one of said side bars which is remote from the axle to which the said swing bar is connected; a plurality of springs interposed between said swing bars and said side bars at near the pivot connection thereof; and riding plates formed on said swing bars at the mid section thereof, and provided with slots formed therein, the curve of said slots being formed from the pivot connection of each of said swing bars and the axle whereupon each is mounted.

2. In an automobile chassis comprising a plurality of rigid side bars, a plurality of carrying wheel axles, said axles being fully extended across the chassis; a plurality of swing bars pivotally connected with said axles and the ends of said side bars, each of said swing bars connecting one of said axles and that end of one of said side bars which is removed from the axle to which the said side bar is connected, said swing bars having straight sections normally disposed substantially in straight line extension between said axles; and a plurality of springs disposed between the body of said chassis and said swing bars, said springs being disposed adjacent the pivoted end of said swing bars.

3. In an automobile chassis comprising a plurality of rigid side bars, a plurality of carrying wheel axles, said axles being fully extended across the chassis; a plurality of swing bars pivotally connected with said axles and the ends of said side bars, each of said swing bars connecting one of said axles and that end of one of said side bars which is removed from the axle to which the said side bar is connected, said swing bars having straight sections normally disposed substantially in straight line extension between said axles; connecting means for said swing bars, flexibly disposed, connecting said straight sections; and a plurality of springs disposed between the body of said chassis and said swing bars, said springs being disposed adjacent the pivoted end of said swing bars.

4. In an automobile chassis, a plurality of swing bars disposed in pairs each of said bars having a straight section pivotally connected with the carrying wheel axles and normally disposed in straight line extension between the said axles, and said swing bars being extended beyond the opposite axle and pivotally connected with the frame of said chassis, and said swing bars being arched adjacent the said opposite carrying axle to clear the same in its swing; and a plurality of springs disposed between the body of said chassis and said swing bars, said springs being disposed adjacent the pivoted end of said swing bars.

5. In an automobile chassis, a plurality of swing bars, each pivotally mounted on one of the carrying wheel axles, said axles being fully extended across the chassis of the automobile, said bars being extended beyond the opposite carrying axle of said automobile, and bent to avoid the said opposite axle; and a plurality of side bars adapted to be rigidly secured to the body of the automobile, said side bars having depended end extensions pivotally connected with said swing bars at a point approximately in line with the two axles when the body of the automobile is loaded.

In testimony whereof I have signed this specification in the presence of two subscribing witnesses.

WILLIAM H. BELL.

Witnesses:
  E. F. MURDOCK,
  PHILIP D. ROLLHAUS.